United States Patent [19]
Hulls

[11] 3,852,664
[45] Dec. 3, 1974

[54] MAGNETIC REED SENSOR SUITABLE FOR USE IN IGNITION TIMING SYSTEMS

[75] Inventor: Leonard Robin Hulls, Marblehead, Mass.

[73] Assignee: RCA Corporation, New York, N.Y.

[22] Filed: Sept. 19, 1973

[21] Appl. No.: 398,876

Related U.S. Application Data

[62] Division of Ser. No. 346,670, March 30, 1973, Pat. No. 3,813,596.

[52] U.S. Cl. .............. 324/41, 335/205, 250/231 R
[51] Int. Cl. ...................... G01r 33/00, H01h 36/00
[58] Field of Search .......................... 335/205–207, 335/179, 234; 324/168, 171, 175, 41, 34 RS; 250/231 R, 232

[56] References Cited
UNITED STATES PATENTS

| | | | |
|---|---|---|---|
| 3,114,020 | 12/1963 | Hall | 335/207 |
| 3,359,455 | 12/1967 | Koda | 335/206 |
| 3,397,372 | 8/1968 | Maxwell | 335/206 |
| 3,535,664 | 10/1970 | Staar | 335/207 |

Primary Examiner—Michael J. Lynch
Attorney, Agent, or Firm—Edward J. Norton; Carl V. Olson

[57] ABSTRACT

A magnetic reed sensor comprises a generally U-shaped permanent magnet having first and second end poles defining a gap of a given distance therebetween and establishing a magnetic flux path thereacross. A reed of flexible magnetic material is fixedly mounted at one end to a support with its other end forming a cantilever projection into the magnetic flux path wherein the flux path is normally symmetrically disposed about the reed. An external ferromagnetic material moved in proximity to said symmetric flux path, creates an unbalanced flux distribution which urges the reed toward one of the pole pieces. One embodiment includes a light source and a light pipe each mounted in opposite directions from the reed so that an optical path is completed between the light source and the light pipe in response to movement of the reed. The magnetic reed sensor then serves as a light shutter which is used in conjunction with an automotive engine to provide an optical indication of the relative timing of the engine.

7 Claims, 7 Drawing Figures

MAGNETIC REED SENSOR SUITABLE FOR USE IN IGNITION TIMING SYSTEMS

This is a division of application Ser. No. 346,670 filed Mar. 30, 1973, now U.S. Pat. No. 3,813,596.

The invention herein described was made in the course of or under a contract or subcontract thereunder with the Department of the Army.

BACKGROUND OF THE INVENTION

Magnetic reed switches have been proposed that have a reed element forming a movable switch arm which is biased to one of two pole members or contacts by a permanent magnet coupling the members. A magnetic rotor (permanent magnet) having spaced magnetic poles of alternating polarity is passed in close proximity to the reed element so that the magnetic fields of the rotor poles alternately move the reed element between the pole members. In the past there have been various problems with this type of switch. For example, the wear which occurs upon the electrical contact surfaces caused by both the physical engagement and the electrical arcing that tends to occur during the making and breaking of the electrical connection as the magnetic reed moves. Secondly, the material of the rotor device of these magnetic reed switches normally takes the form of a brittle, permanently magnetic material and is therefore not always amenable to desired rotor configurations.

In the present invention an improved magnetic reed sensor, which may be utilized as a switch, is used in conjunction with a rotor which can be a "soft" magnetic or ferromagnetic material. One specific embodiment provides an ignition timing system utilizing the improved magnetic reed device. In this regard, prior art systems for providing ignition timing have conventionally taken the form of a portable strobe-light or stroboscope gun which is electrically coupled to the ignition system to provide a flashing light at a rate which is synchronized with engine and cylinder cycles. The strobelight thus far provided illuminates a moving member of the engine, which member carries a predesignated mark. Accordingly, the apparent position of the mark, in the presence of the intermittent illumination, provides a relative indication of ignition timing.

SUMMARY OF THE INVENTION

Briefly, the present invention provides a magnetic reed sensor which facilitates, for example, ignition timing of an automotive engine. The sensor comprises a permanent magnet having first and second end poles defining a gap of given distance therebetween and establishing a magnetic flux path thereacross. A reed of flexible magnetic material is fixedly mounted at one end to a support and has a portion of its other end disposed between the end poles in the path of the magnetic flux. Means for determining the position of the reed relative to the end poles may include a light source and a light transmission means mounted in opposite directions from the reed so that an optical path is completed between the light source and the transmission means in response to movement of the reed. In one embodiment, an ignition timing system includes a magnetic member mounted on a movable member of said engine so as to be translated through a path in close proximity to the reed, thereby, to disturb the magnetic flux path established across the poles when the moving magnetic member is in close proximity to deflect the reed. In this embodiment the light source is coupled to the engine ignition system to provide pulsed output light synchronized with engine and cylinder cycles. The light transmission means of the reed sensor is extended away from the reed to provide an external viewing port. The coincidence between the completion of the optical path and the pulsed output light provides an indication of ignition timing.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION OF PREFERRED EMBODIMENTS

Figure 1A:
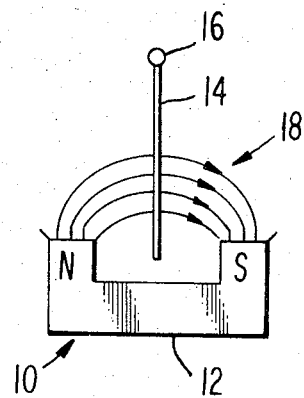
FIGS. 1A and 1B are side elevation views of a magnetic reed sensor device, in accordance with the present invention, illustrating principles of its operation.
Figure 1B:
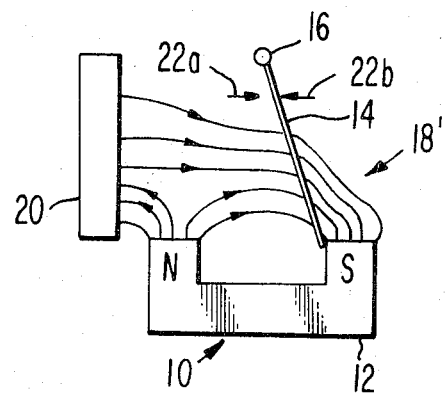

Referring to the Figures of the drawing, FIGS. 1A and 1B show a magnetic reed sensor apparatus 10 which includes a generally U-shaped magnet 12 having North (N) and South (S) poles. Sensor 10 includes a magnetic reed 14 which is pivotally mounted about point 16. Permanent magnet 12 provides a magnetic flux path 18 which is symmetrically disposed about reed 14 when the reed is in its vertical or perpendicular position as represented in FIG. 1A. In FIG. 1A the magnetic flux exerts equal forces on reed 14 as the flux distribution is symmetrical and accordingly the components of the forces at right angles to the reed are equal and opposite. The components parallel to the reed will be in the same direction and will result in a force tending to pull the reed vertically downward toward the permanent magnet. Thus, the reed is in a position of unstable magnetic equilibrium when it is located midway between the N and S poles of magnet 12.

Referring now to FIG. 1B, it can be seen that by providing, for example, a ferromagnetic member 20, in close proximity to sensor 10, the magnetic lines of force 18' are no longer symmetrically disposed about reed 14. The resulting redistribution of the field creates an unbalanced moment on reed 14 which acts to move the reed toward the more concentrated magnetic flux lines about the S pole of magnet 12. If member 20 is removed from proximity to sensor 10, reed 14 will remain in a stable state in the vicinity of the S pole. However, if a fixed-restoring bias is applied to reed 14, such as for example, by fixed stops 22A and 22B, reed 14 will return to a stable center or vertical position upon removal of member 20.

It should now be appreciated that the movement of reed 14 is caused by disturbing the otherwise symmetric flux lines 18. It will also be appreciated that the flux lines can be disturbed by a ferromagnetic or paramagnetic material which need not be a residually magnetic material. In the context of the present specification and the appended claims, the term magnetic material is intended to define a material having a relative magnetic permeability greater than unity. Accordingly, the magnetic material is neither limited to a ferrous, ferromagnetic material, such as iron, nor a permanently magnetic material.

Figure 2A:
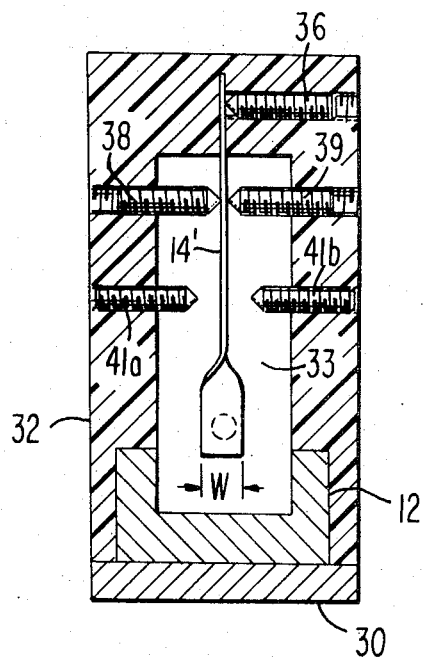
FIGS. 2A and 2B are cross-sectional elevation views of a preferred form of the magnetic reed sensor apparatus in accordance with the invention.
Figure 2B:
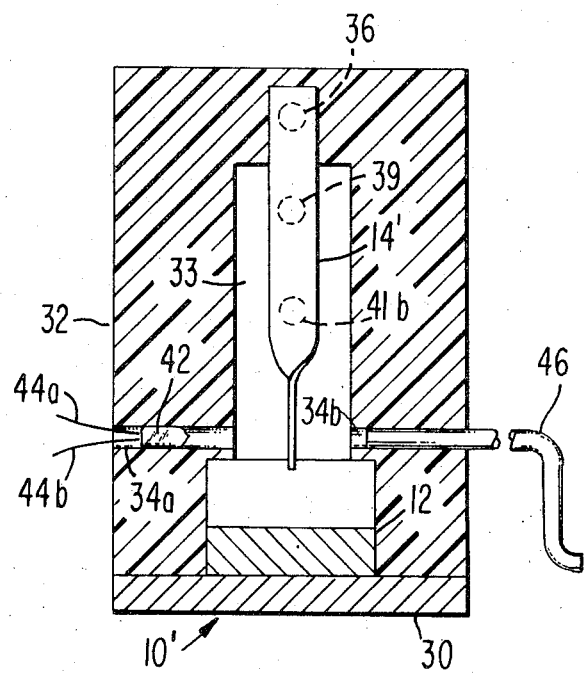

Referring now to FIGS. 2A and 2B there is shown a currently preferred embodiment of a magnetic reed sensor adapted to provide a light shutter in accordance with the present invention. FIG. 2A provides a side elevation of a magnetic reed sensor 10'. The sensor includes a base 30 upon which permanent magnet 12 is mounted. A housing 32 having an inner chamber 33 incapsulates sensor 10'. Housing 32, which preferably comprises a non-magnetic material such as a suitable plastic, includes through-holes 34A and 34B. The magnetic reed 14', having a given width w, is fixedly mounted in an upper portion of housing 32. The setscrew 36 is used to retain reed 14' in the upper portion of housing 32. Thus, the fixed mounting of reed 14' provides a fixed-restoring bias wherein reed 14' is normally maintained in a position of stable equilibrium in the gap formed by the poles of magnet 12. The lower portion of reed 14' provides a shutter, of width w, which may be formed by twisting the lowermost portion of reed 14' through a right angle. Housing 32 further includes setscrews 38 and 39 which provide a fixed restoring bias to reed 14'. Two additional setscrews 41A and 41B are provided to act as stops which limit the travel of reed 14'.

A light source 42 is disposed in through-hole 34A and includes a pair of leads 44A and 44B which are brought out for connection to an external circuit (not shown). A light transmission means 46 is disposed in through-hole 34B and extends a given distance away from sensor 10'. Light transmission means 46 may comprise a fiber-optics bundle, a plastic light-pipe or any other suitable means for directing a source of light to a remote utilization point.

It will be appreciated by those skilled in the art that the magnetic reed sensor, in accordance with the present invention, may also be used as a magnetic reed switch. For example, setscrews 36 and 41b of FIG. 2A may be utilized as electrical terminals to provide an electrical closure when reed 14' is correspondingly deflected. Further, a suitable photo-detector can be substituted for light transmission means 46 in order to provide an electrical output signal indicative of the position of reed 14' relative to the end poles of magnet 12. Accordingly, in the latter configuration the magnetic reed sensor serves the function of a "contactless" magnetic switch.

Figure 3:
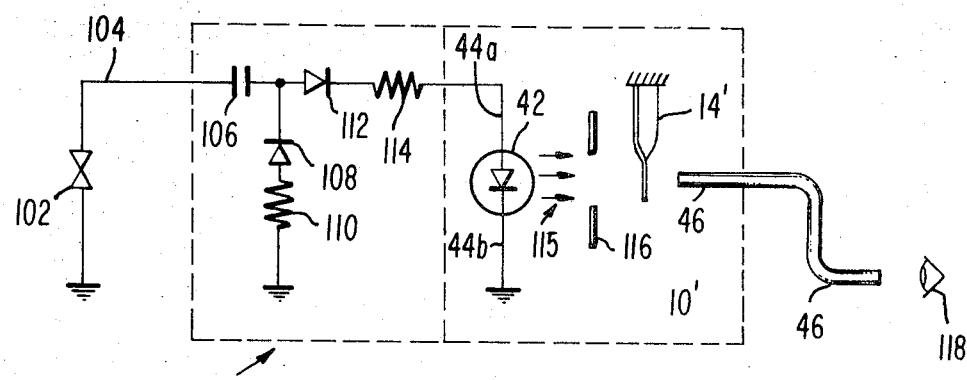
FIG. 3 is a schematic diagram of an ignition timing system incorporating the magnetic reed sensor of the present invention.

Referring now to FIG. 3 there is shown a schematic representation of an ignition timing system 100, including a sensor 10' which utilizes the principles of the present invention. Ignition timing system 100 is shown coupled to breaker points 102 of an automotive engine (not shown) by way of lead 104. Lead 104 is coupled to one terminal of capacitor 106. The other terminal of capacitor 106 is coupled to a point of reference potential, schematically represented as ground, by way of a diode 108 which is serially coupled with a resistor 110. The latter terminal of capacitor 106 is also coupled to the anode of diode 112. The cathode of diode 112 is coupled to a resistor 114. Resistor 114 is coupled to light source 42 by way of lead 44A. The other terminal of light source 42, which takes the form of a light emitting diode in FIG. 3, is coupled to ground by way of lead 44B. The light emitted by source 42 is schematically represented by arrows 115. The emitted light is directed toward an opaque screen 116, which corresponds to through-hole 34A of FIGS. 2A and 2B, having an aperture of a predetermined dimension. The magnetic reed sensor 10' of system 100 includes magnetic reed 14' whose lowermost portion forms an opaque projection as discussed with reference to FIGS. 2A and 2B. Finally, light transmission means 46 is extended to an external viewing point represented by an eyepiece 118.

The operation of system 100 of FIG. 3 is described as follows. As breaker points 102 open and close in synchronism with the engine and cylinder cycles, the voltage potential on lead 104 rapidly rises from ground to the full battery or ignition primary coil (not shown) potential. The current associated with the leading edge of each rising voltage pulse is conducted through diode 112, resistor 114 and light source 42. As breaker points 102 close following this rapid rise in voltage potential, the voltage potential on lead 104 is returned to ground potential. Accordingly, a relatively negative potential, resulting from the charge stored by capacitor 106, will appear at the junction of capacitor 106 and the cathode of diode 108. Diode 108 is poled in a manner which permits the negative potential across capacitor 106 to discharge through diode 108 and serially coupled resistor 110. The purpose of resistors 110 and 114 is to provide current limiting for the discharge path and light source 42, respectively.

It will be appreciated by those skilled in the art that light source 42 may comprise any one of a number of suitable light sources. For example, light source 42 may comprise a neon lamp having its external leads appropriately coupled between the ignition secondary coil (not shown) and ground. Thus, it should now be appreciated that light source 42 provides a pulse of light of a given duration each time the ignition points open. Accordingly, each pulse of light occurs in synchronism with engine and cylinder cycles. System 100 and, more particularly, magnetic reed sensor 10' of FIG. 3 is mechanically coupled to the automotive engine in such a manner that magnetic reed 14' is caused to be deflected in synchronism with the engine and cylinder cycles. It should now be appreciated that magnetic reed 14' may be deflected by an appropriate magnetic member suitably disposed on a moving engine member, such as a crankshaft pulley. Thus, by synchronizing the deflection of magnetic reed 14' with the output light pulses provided by light source 42, a visible, external indication of ignition timing can be provided at the external termination point of light transmission means 46.

Figure 4A:
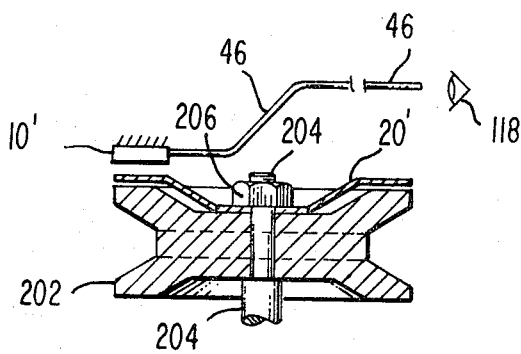
FIGS. 4A and 4B illustrate a preferred adaptation of the system of FIG. 3 shown in conjunction with a crankshaft pulley of an automotive engine.
Figure 4B:
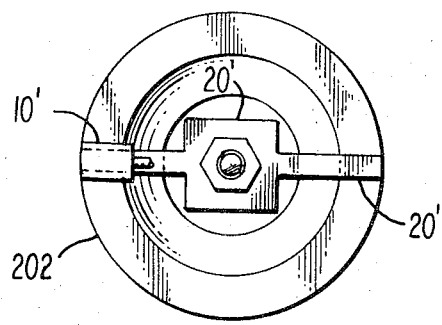

Referring now to FIGS. 4A and 4B there is shown a preferred adaptation of the system of FIG. 3 in conjunction with two views of a crankshaft pulley of an automotive engine. In FIG. 4A a crankshaft pulley 202 is shown coupled to a threaded end of crankshaft 204 and fastened thereon by a hexagonal nut 206. A magnetic member 20' is secured to pulley 202 with the same fastening means, i.e., hexagonal nut 206. Magnetic reed sensor 10' is mounted to any suitable surface or support in close proximity to a selected angular portion of pulley 202. Light transmission means 46 is extended from sensor 10' and provides an external viewing port at eyepiece 118. FIG. 4B provides a top view of pulley 202 and member 20'. It should be noted that member 20' of FIGS. 4A and 4B can be readily formed from any suitable ferromagnetic or paramagnetic material. For example, member 20' can be formed by appropriately working a suitable length of conventional bar-stock. The central portion of member 20' is formed to an appropriate width so as to accommodate mounting of member 20' to crankshaft 204 by way of hexagonal nut 206. The radial extensions of member 20' may take the form of two relatively thin blades as shown in FIGS. 4A and 4B. It will be observed that as pulley 202 rotates about crankshaft 204, member 20' is also caused to be translated through a predetermined path at a rate related to the engine and cylinder cycles of the engine which imparts motion to pulley 202.

As the radial projections of member 20' pass in close proximity to magnetic reed sensor 10', the magnetic reed 14' of sensor 10' is accordingly deflected during a corresponding portion of the crankshaft's angular displacement. Thus, by preestablishing the fixed position of member 20' with respect to rotating pulley 202, so that the light output pulses of device 10' occur in synchronism with engine and cylinder cycles, an external optical indication of engine timing can be provided by way of light transmission means 46.

It should be noted that member 20' of FIGS. 4A and 4B effectively provides two individual magnetic members spaced 180° apart on crankshaft pulley 202. This is done to increase the intensity of the available light output signal. That is, in a four-cycle, four-cylinder engine, two ignition firings are experienced during each crankshaft revolution. Geometrically, these engine firings occur at points spaced 180° apart. Thus, during each crankshaft revolution, two light output pulses are provided which, therefore, may advantageously be utilized to increase the available light output intensity at eyepiece 118. It should now be appreciated that by providing a dual projection with respect to member 20', the available output light is approximately twice that which would be available if a single projection were deployed. Similarly, for a four-cycle, eight-cylinder engine, four radial projections may be employed to provide a maximum output light indication. However, it will be understood that, in any event, a usable output light indication can nonetheless be provided with but one magnetic member, i.e., a single radial projection.

The ultimate utility of an ignition timing system such as that depicted by FIG. 3 and FIGS. 4A - 4B can be realized by judiciously and advantageously aligning magnetic member 20' with reference to sensor 10'. In this regard, it can be seen that the angular width of the shutter opening provided by sensor 10' may be a substantial number degrees of crank angle in some system configurations. Accordingly, if the position of sensor 10' is phased with the crank angle so that the timing flash is observed only when the ignition timing is retarded, a greater degree of timing accuracy can be realized. For example, the position of sensor 10' can be selected such that the shutter just begins to open when the ignition is retarded. Thus, to realize a fixed accurate reference for the occurrence of the flash, the distributor may be adjusted to first produce an optical indication which indicates that the ignition timing is slightly retarded. Thereafter, the distributor can be readjusted until the flash just disappears. This, then, is the point where the flash occurs just beyond the edge of the blade of the magnetic member which actuates or deflects the magnetic reed and, accordingly, this point may be selected to correspond to the desired engine ignition timing. It will also be appreciated by those skilled in the art that the magnetic reed shutter can be positioned in a variety of configurations in order to be utilized as an accurate indication of proper ignition timing. Further, various slits or openings can be provided at the lowermost portion of the magnetic reed 14' and/or a corresponding slit provided at the detector end of light transmission means 46 to provide and further facilitate a desired optical signal, indicative of the desired ignition timing, at eyepiece 118.

What has been taught, then, is a magnetic reed sensor facilitating, notably, an ignition timing system. In a preferred configuration, the magnetic reed sensor provides an ignition timing device which in turn provides a means for directly observing the state of the ignition timing. Since the device in this preferred configuration operates on the principle of coincidence between a magnetically actuated shutter opening (driven by a magnetic member mounted on the crankshaft or other suitable moving member) and an ignition driven flash, accurate ignition timing can be provided without necessitating an external timing device such as a strobelight or stroboscope.

What is claimed is:

1. A magnetic reed sensor comprising, in combination:

a housing of non-magnetic material;

a permanent magnet mounted at one end of said housing, said magnet having first and second end poles defining a gap of given distance therebetween and establishing a magnetic flux path thereacross;

a reed of flexible magnetic material fixedly mounted at one of its ends to the other end of said housing, said reed having a portion of its other end disposed centrally in said gap between said end poles in said magnetic flux path, so that said reed is normally maintained in a central position of stable equilibrium in said gap;

a magnetic member adapted to be mounted external of said housing and to be movable in a path passing in close proximity to said magnetic flux path, to disturb the magnetic flux path established across said poles only when said member is in close proximity to said housing, thereby to cause said flexible reed to be deflected away from the path of said moving member and toward the more distant one of said end poles; and means for determining the position of said reed relative to said end poles.

2. The sensor according to claim 1, wherein said magnet comprises a generally U-shaped magnet, wherein said reed forms a cantilever projection into said flux path and wherein said flux path is symmetrically disposed about said reed except when said flux path is substantially disturbed by said member being in close proximity to said reed.

3. The sensor according to claim 2, wherein said positioning determining means includes a light source and light transmission means mounted in opposite directions from said reed so that an optical path is completed between said source and said transmission means in response to movement of said reed.

4. The sensor according to claim 3, wherein said light transmission means comprises a light-pipe having a first end coupled to said housing opposite said light source and having a second end extended a given distance from said housing.

5. The sensor according to claim 1, wherein said positioning determining means includes a light source and light transmission means mounted in opposite directions from said reed so that an optical path is completed between said source and said transmission means in response to movement of said reed.

6. The sensor according to claim 1, including means for limiting the deflection of said reed between said end poles to a predetermined distance which is less than said given distance.

7. The sensor according to claim 1, wherein said positioning determining means includes at least one electrical contact coupled to said housing and arranged to engage said reed when said reed is caused to deflect a given distance, whereby the engagement of said reed and said contact forms an electrical closure.

* * * * *